United States Patent

[11] 3,630,236

| [72] | Inventor | Richard E. Diggs<br>210 North River St. P.O. Box 588,<br>Carthage, Mo. 64836 |
|---|---|---|
| [21] | Appl. No. | 50,806 |
| [22] | Filed | June 29, 1970 |
| [45] | Patented | Dec. 28, 1971 |

[54] CONTINUOUS MINI-FLOW IRRIGATION DEVICE
11 Claims, 6 Drawing Figs.
[52] U.S. Cl. ............................................. 138/45
[51] Int. Cl. ............................................. F15d 1/02
[50] Field of Search ............................................. 138/37–46

[56] References Cited
UNITED STATES PATENTS

| 2,960,109 | 11/1960 | Wilson | 138/46 |
| 3,409,050 | 11/1968 | Weese | 138/45 |
| 3,073,349 | 1/1963 | Mitchell | 138/45 |
| 2,936,788 | 5/1960 | Dahl et al. | 138/45 |
| 2,781,061 | 2/1957 | Frey | 138/46 |

Primary Examiner—Houston S. Bell, Jr.
Attorney—Shoemaker & Mattare

ABSTRACT: A continuous mini-flow irrigation device wherein a metering cone having a metering slot therein is adjustably inserted through a resilient washer for adjustably metering flow through the irrigation device. Full flow through the device is achieved when the metering cone is fully inserted through the washer, which insures that the metering slot will not become plugged with debris and further wherein under varying pressure conditions the washer will be deformed into the metering slot to maintain a uniform continuous flow from the irrigation device.

PATENTED DEC 28 1971          3,630,236

INVENTOR
RICHARD E. DIGGS

BY Shoemaker and Mattare
ATTORNEYS

CONTINUOUS MINI-FLOW IRRIGATION DEVICE

BACKGROUND OF THE INVENTION

Irrigation devices currently in use can be classified broadly into three categories: gravity surface flood types; above surface pressure sprinkler systems; and subsurface seep methods.

Each of these three basic methods have inherent disadvantages. Some chief examples of the disadvantages with these three methods are inefficient use of water due to water percolation below the useable root zone, runoff at the tail of the field, evaporation from wet leaf and soil surfaces, uneven application, and irrigation of areas where few or no plant feeder air roots exist.

Further, methods wherein lower initial cost is involved usually require unexceptable amounts of physical labor and very high time requirements to operate the systems. On the other hand, the systems which are designed to save labor and time usually require high capital investments and considerable power is required for operating the pressure sprinklers with a resulting high fuel expense for operating pumps and the like.

The present invention provides a simple and economical irrigation device which overcomes the problems inherent in prior art devices wherein irrigation is continuous and is accomplished at a low rate so as to achieve a proper soil structure with respect to the air and soil bacterial balance.

OBJECTS OF THE INVENTION

It is an object of this invention to provide an irrigation device having maximum efficiency and minimum useage of water.

It is another object of this invention to provide an irrigation device wherein at least 40 percent less water is required to grow an equal crop as compared with the best of the prior art devices.

It is a further object of this invention to provide an irrigation device which uses as much as 70 percent less water than currently available flood irrigation devices which are notably inefficient.

It is a still further object of this invention to provide an irrigation device wherein little or no water is lost from the root zone due to over or uncontrolled irrigation.

It is a still further object of this invention to provide an irrigation device wherein no water is lost due to runoff at the tail of the field.

It is a still further object of this invention to provide an irrigation device wherein only a small area of soil surface is wet, thereby eliminating most evaporation losses.

Still another object of this invention is to provide an irrigation device which will irrigate only the area or areas containing hair roots for plant growth.

It is a further object of this invention to provide an irrigation device wherein the water application to the area to be irrigated is slow and continuous to maintain the best soil structure insofar as air and soil bacterial balances are concerned.

A further object of the invention is to provide an irrigation device wherein irrigation is continuous and which requires very little labor or time after installation except for occasional inspection of plant growth, resulting in a time and labor saving of approximately 95 percent over prior art devices.

An even further object of the invention is to provide an irrigation device wherein the irrigation is continuous and wherein small amounts of water are required at very low pressures so that small pumps may be used with resultant low fuel consumption and savings in the expense of operation.

A further object of the invention is to provide an irrigation device wherein an adjustable metering orifice is provided.

A still further object of the invention is to provide an irrigation device wherein the metering orifice will not become plugged with debris and the like.

A still further object of the invention is to provide an irrigation device wherein a constant flow of irrigating water is automatically maintained.

BRIEF DESCRIPTION OF THE DRAWINGS

FIG. 5 illustrating the device as used with a T-connection and FIG. 6 illustrating the device as used with a connection having five separate and individually controlled outlets.

Detailed Description of the Invention

Figure 1:
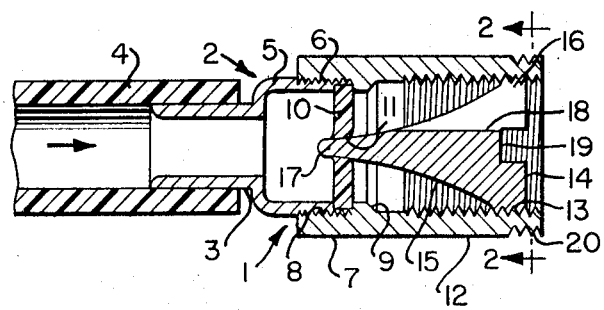
FIG. 1 is a sectional view in elevation of an irrigation device according to the present invention, wherein the metering plug is adjusted for no flow.
Figure 2:
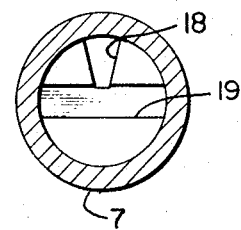
FIG. 2 is an end view in section of the irrigation device according to the present invention taken along the line 2—2 in FIG. 1.

Referring now to the drawings wherein like reference numerals refer to like parts throughout the several views, the mini-flow irrigation device according to the present invention is indicated generally at 1 in FIG. 1 and comprises an adapter or fitting 2 having a reduced diameter end portion 3 fitted inside the outlet end of an inlet conduit or water pipe 4 made of a suitable material such as plastic or steel or the like. The fitting or adapter 2 has an enlarged diameter outlet portion 5 externally threaded at 6 and a tubular sleeve or body 7 having an internally threaded portion 8 in one end thereof is matingly received over the threads 6 on adapter 5. A shoulder 9 is formed inside the sleeve 7 intermediate the ends thereof and adjacent the inner end of the threads 8 in axially spaced relationship to the end of fitting 2. A suitable resilient washer 10 having an opening 11 centrally therethrough is held between the end of fitting 2 and shoulder 9. The opposite or outlet end 12 of sleeve 7 is internally threaded at 13 and a metering cone 14 having a tapered outer surface 15 is threadably adjustably received within the sleeve 7 and has external threads 16 on the enlarged end portion thereof in mating threaded engagement with the threads 13 in the sleeve 7. The reduced end portion or tip 17 of the cone 14 is snugly received through the opening 11 in washer 10 and in the position shown in FIG. 1 closes off flow through the device. A metering slot 18 having a generally V-shaped cross section is formed in one side of the metering cone and extends from a point adjacent the tip 17 thereof through the opposite enlarged end of the metering cone 14. A screwdriver slot 19 is provided in the base of the cone 14 for threadably adjusting the metering cone toward and away from the washer 10 to adjustably meter flow therethrough.

Figure 3:
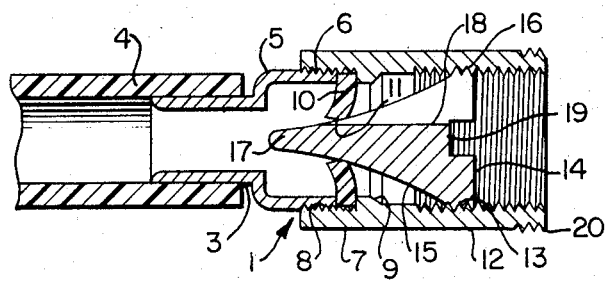
FIG. 3 is a view similar to FIG. 1, wherein the metering cone is adjusted to a low-flow position.

As shown in FIG. 3, the metering cone 14 has been adjusted inwardly of the sleeve 7 toward the washer 10 with the slot 18 extended partially through the opening 11 through the washer 10 whereby flow occurs through the slot. In this position, the metering cone 14 is set at a minimum flow position.

Figure 4:
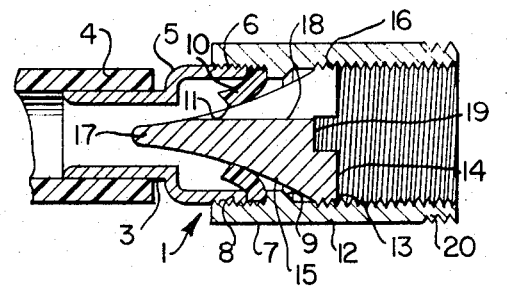
FIG. 4 is a view similar to FIG. 1, wherein the metering cone is adjusted for maximum flow.

In FIG. 4, the metering cone 14 has been threadably adjusted in the sleeve 7 toward the washer 10 a maximum extent, with the cone positioned through the opening 11 in the washer 10 such that the maximum flow is realized through the slot 18.

As is readily apparent from these figures, the metering cone is set at a no flow position when it is backed away from the washer 10 with the tip portion 17 of the cone disposed in the opening 11 through the washer, and as the cone is adjusted toward the washer, the flow through the device is increased. It is apparent that with this construction, the metering slot 18 of the metering cone 14 would have a self-cleaning tendency and would be highly resistant to becoming plugged with debris and the like in the water passing through the device due to the fact that any small particle of debris entering through the opening 11 in the washer 10 and in the slot 18 would be flushed into the larger downstream opening provided by the slot 18. Prior art devices, on the other hand, generally have a metering slot which decreases in cross section downstream of the metering opening and debris which enters the slot tends to become lodged therein.

Further, the construction of the present invention affords a constant flow through the device regardless of pressure changes upstream of the metering cone 14 and washer 10 since the resilient washer 10 will deform into the metering slot 18 under high-pressure conditions. Accordingly, uneven irrigation of different areas in a field being irrigated is avoided and a constant and continuous flow or irrigation water throughout an irrigated area is realized.

Figure 5:
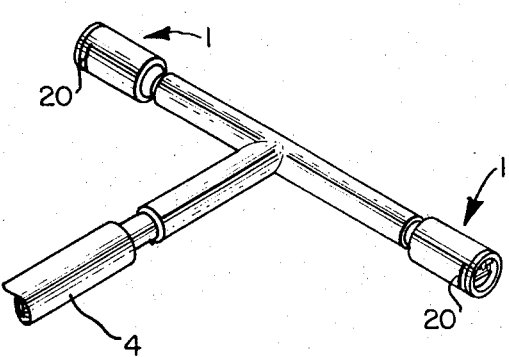
FIGS. 5 and 6 are top perspective views of irrigation systems incorporating the mini-flow irrigation device according to the present invention.
Figure 6:
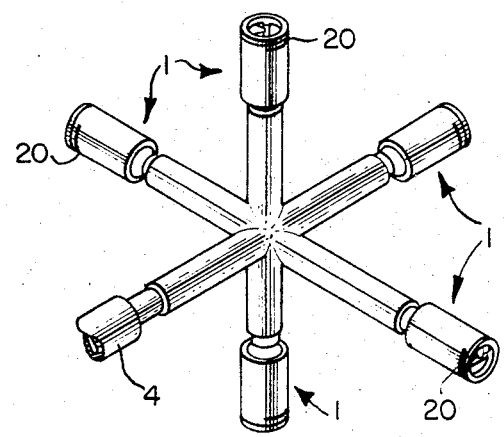

FIGS. 5 and 6 illustrate various applications of the present invention, wherein an outlet T-fitting (FIG. 5) is fitted to the inlet conduit and a mini-flow irrigation device according to the present invention is fitted in each outlet of the "T" for independently controlling the flow of irrigating water to a plurality of points from a common inlet.

Alternatively, a fitting having more than two outlets such as the jack-type fitting illustrated in FIG. 6 can be used wherein five outlets are provided from a common inlet, each of the outlets having an independently adjustable mini-flow irrigation device therein.

Further, the mini-flow irrigation device may be provided with external threads 20 (FIGS. 1-4) on the outlet end of the sleeve 7 for attachment thereto of suitable conduit means or the like for conveying water metered by the device to remote areas.

The mini-flow irrigation device aforedescribed, may be used to discharge water above the surface of the ground and the water permitted to soak in or it may be disposed underground for irrigation by the seep method. Still further, it can be readily seen that the mini-flow irrigation device can be modified to water greenhouse pots, plants and crops, yard and landscape shrubs and lawns, gardens, orchards and groves, vinyards, row and field crops and the like, either above or underground.

In summation, the present invention provides a mini-flow irrigation device which is extremely simple and inexpensive and which has a cone-shaped controlling element wherein the metering passage therethrough is resistant to becoming plugged by debris carried in the water and which further automatically compensates for variable pressures in the inlet water to maintain a constant flow of water from the device. The irrigation device aforedescribed requires practically no labor in its operation resulting in a tremendous savings in money and time and further resulting in a significant savings in the quantity of water used, the device using only the amount of water necessary to irrigate an optimum amount. Further, the device may be used above ground or underground and it prevents losses of water due to evaporation that would occur in sprinkler or flood irrigation systems. Still further, it has the ability to irrigate only those areas of the root zone where irrigation is desired, and it produces a much higher yield with some crops than any other type of irrigation system now used.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. An irrigation device for maintaining a continuous and constant low rate of flow therethrough, comprising a tubular body means, a resilient washer mounted in said body means between the ends thereof, said washer having a central opening therethrough, a tapered, generally cone-shaped metering element adjustably mounted in said body means downstream of said washer and having a reduced diameter tip portion and an enlarged diameter base portion, said tip portion of said metering element received in said central opening in said resilient washer, a metering slot in at least one side of said metering element extending axially through said base portion, said slot increasing in cross-sectional area toward the base portion, whereby as said tip portion and said slot are extended further into and through said central opening the flow rate through the device is increased.

2. An irrigation device as in claim 1, wherein said metering slot extends from a point spaced axially inwardly from the end of said reduced diameter tip portion through said enlarged diameter base portion, the end of said tip portion having a diameter substantially equal to the diameter of the central opening through said washer so that flow through said device is precluded when said end is received in said opening.

3. An irrigation device as in claim 1, wherein said metering element is secured within a cylindrical sleeve, and said resilient washer is secured within said sleeve upstream of said metering element.

4. An irrigation device as in claim 3, wherein said metering element is threadably adjustably received in said sleeve.

5. An irrigation device as in claim 4, wherein said resilient washer deforms into said metering slot in said metering element under high-pressure conditions upstream of said washer to decrease the flow cross section and maintain a constant flow through said irrigation device.

6. An irrigation device as in claim 5, wherein a radially inwardly extending shoulder is formed in said cylindrical sleeve intermediate the ends thereof and wherein said resilient washer is clamped against said shoulder.

7. An irrigation device as in claim 6, wherein an adapter fitting is secured within the upstream end of said cylindrical sleeve and said resilient washer is clamped between the end of said fitting and said shoulder.

8. An irrigation device as in claim 7, wherein the downstream end of said cylindrical sleeve is externally threaded for attachment thereto of conduit means for conveying the metered flow of water to a remote area.

9. An irrigation device as in claim 8, wherein a plurality of outlets are connected to a common inlet, with a metering means as aforedescribed independently adjustably fitted in each of said plurality of outlets.

10. An irrigation device as in claim 9, wherein there are two outlets.

11. An irrigation device as in claim 9, wherein there are five outlets.

* * * * *